Oct. 16, 1956  A. WALDORF  2,766,528
ISOMETROGRAPH

Filed Oct. 22, 1953  4 Sheets-Sheet 1

INVENTOR
ADRIAN WALDORF

BY

ATTORNEYS

Oct. 16, 1956
A. WALDORF
2,766,528
ISOMETROGRAPH
Filed Oct. 22, 1953
4 Sheets-Sheet 2
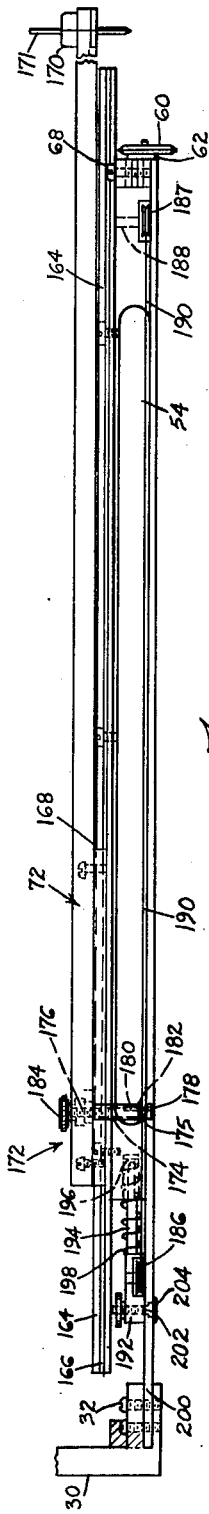
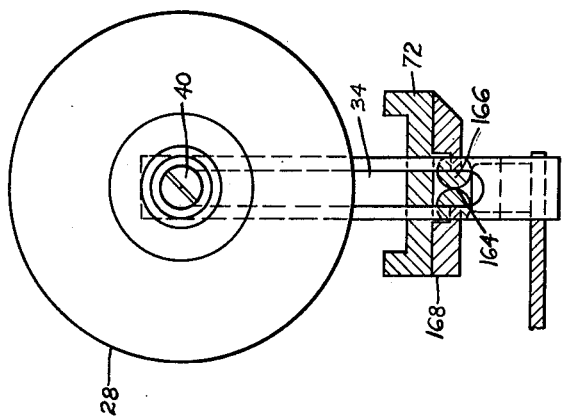
INVENTOR
ADRIAN WALDORF
BY
ATTORNEYS Oct. 16, 1956  A. WALDORF  2,766,528
ISOMETROGRAPH Filed Oct. 22, 1953 4 Sheets-Sheet 3

INVENTOR
ADRIAN WALDORF
BY
ATTORNEYS

Oct. 16, 1956

A. WALDORF 2,766,528

ISOMETROGRAPH

Filed Oct. 22, 1953

INVENTOR
ADRIAN WALDORF

BY

ATTORNEYS

United States Patent Office 2,766,528
Patented Oct. 16, 1956

2,766,528

ISOMETROGRAPH

Adrian Waldorf, Port Washington, N. Y.

Application October 22, 1953, Serial No. 387,815

15 Claims. (Cl. 33—23)

(Granted under Title 35, U. S. Code (1952), sec. 266)

The invention described herein may be manufactured and used by or for the Government of the United States of America for governmental purposes without the payment of any royalties thereon or therefor.

This invention relates to a drafting instrument capable of converting an orthographic projection into an isometric projection, or may be used to trace ellipses from circles.

An object of the invention is to provide a device capable of accurately producing an isometric projection when used with an orthographic projection through resolution of the input movements into X and Y components.

Another object of the invention is to provide a device that is capable of producing ellipses in any range between zero and ninety degrees.

Another object of the invention is to provide a quadrant assembly that is capable of transmitting the X component directly, and the Y component is led through a cord arrangement to give equal linear displacement of the X component, adjustable in position to any selected angle.

A feature of the invention resides in the combination of an ellipse template and quadrant whereby rotation of the ellipse template arm generates a perfect circle as input into the quadrant.

Another feature of the invention resides in the use of tension means adapted to urge the marking instrument into contact with the work sheet together with a finger grip for easy manipulation to control the tension means, whereby the marking tool may be readily raised or lowered into use.

Another feature of the invention resides in a suitable friction or positive locking device provided on the quadrant arm and ellipse template arm to prevent accidental movement of the settings.

Another feature resides in the endless cord construction for moving the pencil along the X axis as the stylus moves along the Y axis.

Other objects and many of the attendant advantages of this invention will be readily appreciated as the same becomes better understood by reference to the following detailed description when considered in connection with the accompanying drawings wherein:

Fig. 2 is an end view of the isometrograph as seen on line 2—2 of Fig. 1,

Figure 1:
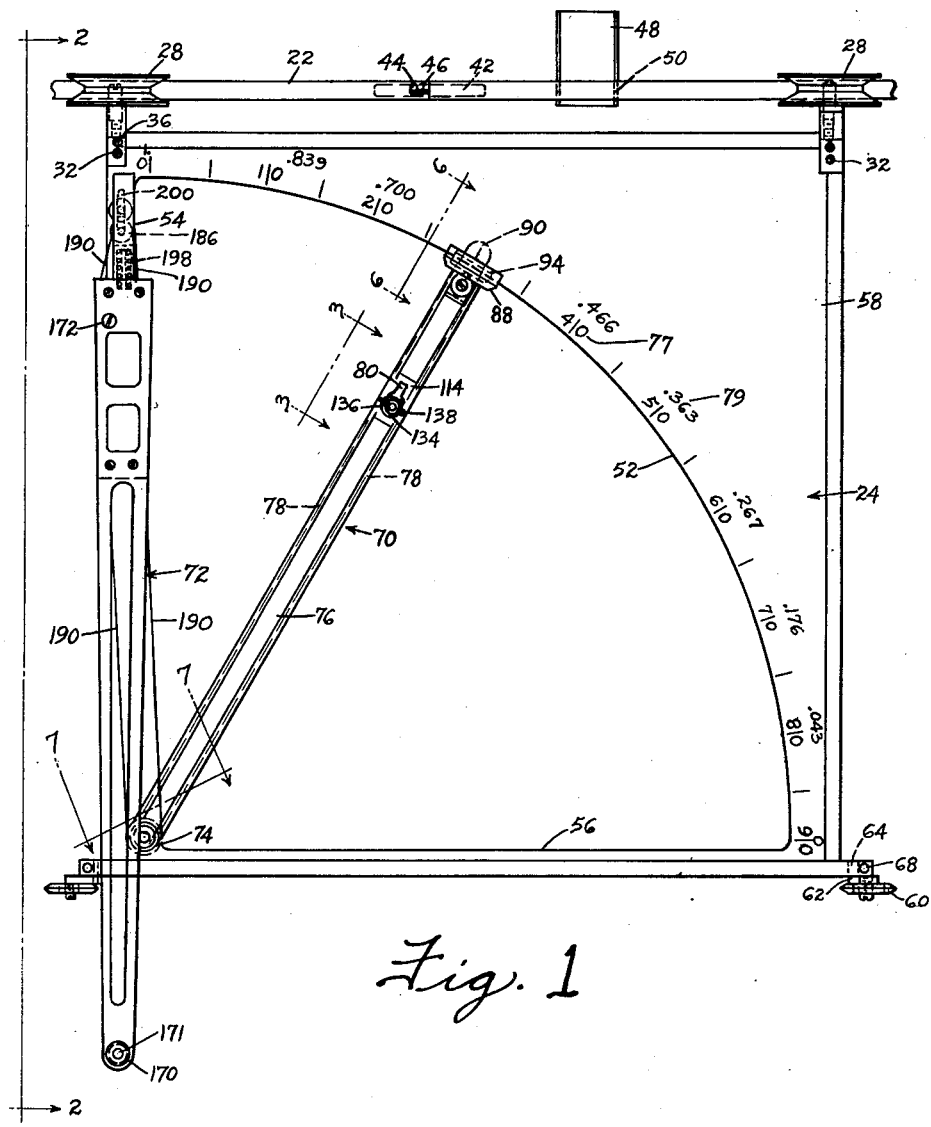
Fig. 1 is a plan view of the device of the invention.
Figure 6:
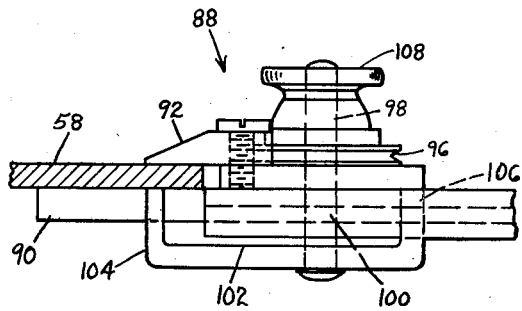
Figures 3, 7:
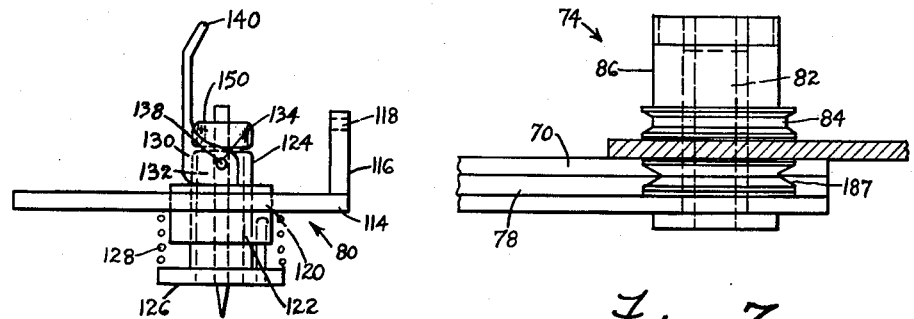
Figure 8:
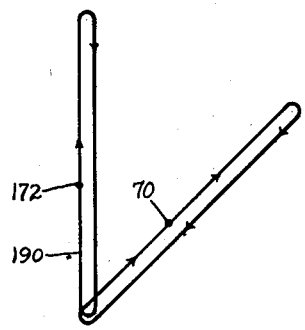
Figure 9:
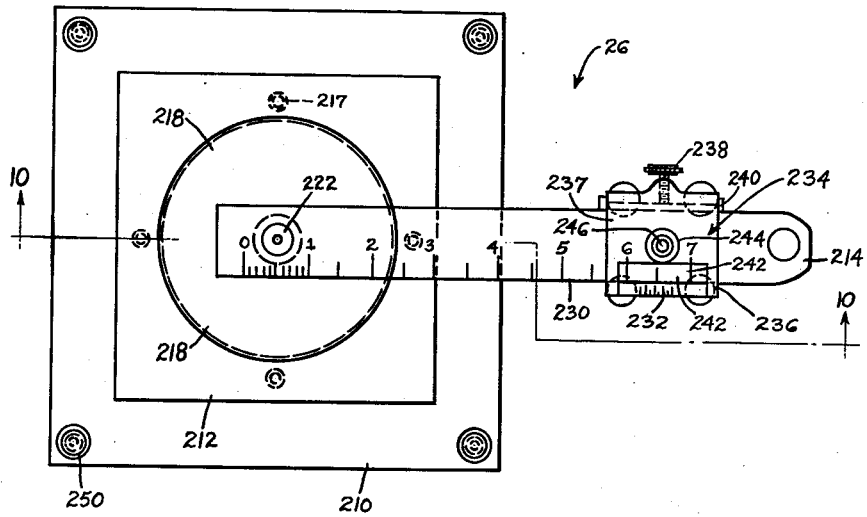
Figure 10:
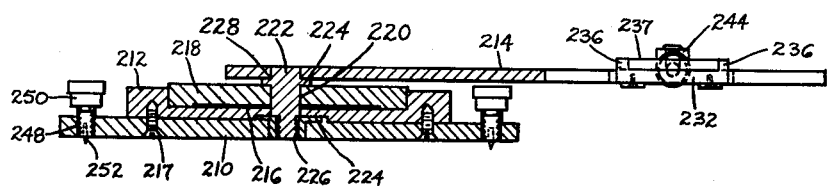
Figures 11, 12:
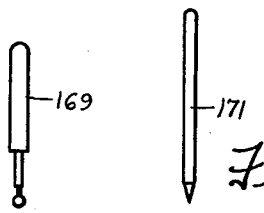

Fig. 3 is an end view taken on line 3—3 of Fig. 1 illustrating in enlarged detail the scribe holding means, Fig. 4 illustrates the lead holders to be inserted into the scribe holder, Fig. 5 illustrates the pen to be inserted into the scribe holder, Fig. 6 is an end view taken on line 6—6 of Fig. 1 illustrating the vernier adjustments, Fig. 7 is an end view taken on line 7—7 of Fig. 1 and illustrates one of the pulleys used in the operation of the device, Fig. 8 schematically illustrates the endless band arrangement for moving the scribe means, Fig. 9 is a plan view of the ellipse template, Fig. 10 is a section taken on line 10—10 of Fig. 9 and illustrates the template construction, Fig. 11 illustrates a stylus pin used when ellipses are to be projected, Fig. 12 illustrates a stylus pin used when an isometric view is to be made, and Fig. 13 is a detail of a quadrant wheel support movable on the X axis.

The isometrograph of the invention is a combined drafting instrument that is capable of producing an isometric projection from an orthographic projection, and when desired, is capable of producing an ellipse from a circle. This represents a sharp advance over existing methods. Ordinarily, the projection of an isometric view is a hand operation consuming a great deal of time and depending mainly on the skill of the draftsman. This is also true for the formation of ellipses, where the X and Y axes with the maxima and mimima information are used. Some semi-mechanical means are used, such as ellipse templates, but these at best are no more than auxiliary aids.

The isometrograph of the invention is shown in Figure 1 and comprises a rail 22, quadrant assembly 24 and ellipse template 26. The latter is used only when ellipses are to be drawn.

Rails 22 support roller wheels 28, which are secured to the ends of quadrant 24 by means of L-shaped brackets 30, at 32. The vertical legs of brackets 30 are slotted at 34 and receive therein bearings 36 in which are journaled wheel support screws 40 for movement of the wheels on rails 22. Rails 22 comprise a plurality of interfitting lengths. One end of rail 22 includes an extension 42 of reduced diameter with upstanding lug or pin 44 to receive the bayonet slotted end 46 of the adjacent rail section. Obviously, other desired means for providing a rail 22 may be substituted without departing from the scope of the invention.

U-shaped brackets 48 are clamped to the table in any desired manner and support rails 22 in an elevated position. Slots 50 on the vertical arms of brackets 48 prevent accidental movement of the rail.

Quadrant assembly 24 comprises a rectangular frame of any suitable light weight but rigid material and includes a triangular cut out section, one leg of the triangle 52 being in the form of an arc of a circle. The other two legs are at right angles to each other and constitute two sides 54 and 56 of the rectangular frame. Arc 52 is continuous with thin plate 58 which terminates at the remaining two sides of the frame. This provides rigidity for the assembly and may be used for inscribing any desired information. If preferred, frame 24 may be made lighter by elimination of the plate.

Rollers 60 are mounted on the frame side 56 in parallel relation to wheels 28 and are adjustable by means of levers 62 pivotally retained at 64 in side 56. The free ends of side members 56 are slotted at 66 and receive therethrough tightening screws 68 which serve to securely retain rollers 60 in adjusted position.

Quadrant arm 70 and stylus arm 72 are cooperatively retained on quadrant assembly 24, as will presently appear. Arc 52 is graduated in five degree divisions at 77 from zero to 90 degrees. These represent the isometric scale used for isometric projection. Ellipse scale 79 forms an outer row of indicia from 1.000 to .000 and represents the ratio of the Y axis to the X axis.

Arm 70 is secured to ear 74 extending horizontally at the intersection of quadrant assembly sides 54 and 56 and includes a channel 76 extending its entire length from a point adjacent the end of ear 74 to the opposite extremity thereof. Slots 78 on the frame of quadrant arm 70 are in parallel relation on each side of channel 76 and provide the guide means for scribe holder 80 held slidably within channel 76.

Referring to Fig. 7, vertical post 82 is fixed on ear 74 and retains thereon for free rotation pulley wheel 84. Guard or sleeve 86 overlies pulley 84 to prevent inadvertent removal from post 82 or any loose movement on said post.

Clamp assembly 88 is best illustrated in Figure 6 and is secured in channel 76 adjacent arc 52. Clamp 88 comprises a lower flat bar 90 seated in channel 76 and extended forward beneath plate 58, and an upper vernier member 92 extending a short distance on the upper surface of plate 58. Vernier 92 is suitably marked at 94 (see Fig. 1) for fine adjustment of vernier arm 70. Pulley wheel 96 is rotatably held on bar 90. Threaded aperture 98 extends through vernier 92, pulley wheel 96 and bar 90 and receives therethrough the threaded post or stem 100 of tightening clamp 102. Clamp 102 includes lateral wings having spaced vertical fingers 104 adapted to seat underneath plate 58 on either side of bar 90. Rear finger 106 extends vertically in spaced relation from fingers 104 and extends into channel 76 to seat against bar 90. Locking screw 108 is retained on stem 100 and forces vernier 92 and clamp 102 together to retain quadrant arm 70 in adjusted position. Release of screw 108 permits arm 70 to swing on pivot post 82 to describe an arc of ninety degrees or less.

Holder 80 is slidably held within channel 76 and is the means by which pencil 110 or pen 112 is retained for movement on the Y axis. Holder 80 comprises a plate 114 at one end of which vertical fingers 116, apertured at 118, extend for a purpose soon to become clear. Plate 114 includes an enlarged hole or aperture 120 into which is fitted a sleeve 122. An internally threaded barrel or tubular housing 124 is slidably retained within sleeve 122. The lower extremity of tube 124 includes an annular flange 126. Spring 128 is retained on tube 124 between flange 126 and the bottom of plate 114. Bifurcated cam lever 130 includes horizontal ears 132 apertured at 134 and in alignment with apertures 136 on tubular member 124 to receive therethrough pivot pins 138. Cam lever 130 is L-shaped with ear 132 resting on the surface of plate 114 and a vertical ear 140 being engaged by the draftsman or operator to pivot the lever about pins 138. A cam action is obtained so that when the lever is in the vertical position shown in Fig. 3, expansion spring 128 urges tubular member 124 into lowered position enabling the writing implement 110 or 112 retained therein to engage the work sheet. When cam lever 130 is in a horizontal position, tube 124 is raised against the force of the spring, raising the pen or pencil from the work sheet below.

Pencil holder 110 includes an elongate body 142 tapered at one end at 144 and provided with slits 146. A threaded intermediate section 148 enables holder 110 to be securely held in tube 124. Knurled head 150 facilitates insertion of holder 110 in barrel 124. A longitudinal passage 152 receives the pencil lead and when member 110 is inserted into tube member 124, the slit end 144 is compressed to securely hold the pencil lead in position.

If desired, pen 112 may be used instead of pencil 110. The body 154 includes a threaded exterior section 156 similar to threaded section 148 on pencil holder 110, as well as a passage 158 and a knurled head 160. The exterior section terminates in a pen point sheath 162.

Fig. 2 illustrates the construction of stylus arm in detail and discloses a track 164 mounted on side wall 54 of the frame. Track 164 extends horizontally the length of wall 54 and slightly beyond the end thereof. Grooves 166 are provided on each side of track 164 in parallel relation and extend the length of the track to retain stylus arm 72 in a horizontally slidable position by means of slide block 168 secured to stylus arm 72 and riding in grooves 166.

Stylus arm 72 slides on track 164 and actuates member 80 to obtain the isometric or ellipse projection desired. A vertically extended bushing 170 at the free end of stylus arm 72 receives stylus pins 169 or 171, depending on the use to which the device is to be put (see Figs. 11 and 12). Stylus arm cable clamp assembly 172 extends through the other end of stylus arm 72 and includes axial passageway 174, retaining a clamp stem 175 threaded at the upper free end 176 and flanged at the other external end 178. Keyway 180 in passage 174 retains clamp key 182 for limited vertical movement. Knurled screw 184 engages threads 176 to raise or lower the clamp stem.

Pulleys 186 and 187 are mounted rotatively on stems 188 at each end of frame member side 54 to retain, together with pulleys 84 and 96, an endless band or cord 190. Band 190 is illustrated schematically in Fig. 8 and has one end thereof secured in aperture 118 of fingers 116 or holder 80. Cord 190 is trained around pulleys 84, 186, 187, and pulley 96 and is secured to aperture 118 to form an endless band.

Movement of stylus arm 72 moves endless band 190 to actuate scribe holder 80. Knob 184 on assembly 172 is rotated to release stem 175 and to allow band 190 to be inserted in the space between flange 178 and the bottom of the stem holder, as is shown in Fig. 2. Knob 184 is then tightened to clamp band 190 in cable clamp assembly 172 to move band 190 in the direction of the arrows (see Fig. 8) when stylus arm 72 is actuated. Band 190 is kept taut by means of housing 192 mounting an extension rod or pin 194, which in turn is slidably retained in an elongated bore or slot 196 in quadrant side 54. Expansion spring 198 is sleeved on pin 194 and bears against the inner surface of bore 196 and against housing 192. Housing 192 is slidable in slot 200 by means of stem 202 extended vertically through said housing. Flange 204 on stem 202 grips quadrant 24 when operating knob 206 is tightened on stem 202 to retain housing 192 in any position of adjustment within the length of slot 200. This is the primary means to keep band 190 taut, while the spring tension means adds assurance that the clamp will not accidentally loosen and thereby prevents any slack from occuring in the endless belt. Pulley 186 is rotatively held within housing 192. In this manner, endless belt 190 is kept in taut condition at all times by means of expansion spring 198 and clamp means 202.

The device has many varied uses in isometric projections from orthographic designs. Generally, isometric views are projected at a 30° angle and quadrant arm 70 is pivoted about vertical post 82 until it is aligned with the 30° indicia mark at 77. Vernier scale 94 permits accurate setting. Locking screw 108 clamps the quadrant arm into position. Stylus 171 is inserted into bushing 170 and pencil 110 or pen 112 is fixed into scribe holder 80. Stylus arm 72 is moved so that stylus 171 is in position for tracing over an orthographic figure. Movement of stylus arm 72 along the figure placed beneath the stylus causes the same linear displacement of quadrant arm 70, since endless band 190 moves scribe holder 80 a distance equal to the distance traveled by stylus 171. The angle at which arm 70 is positioned causes the figure to be tilted to obtain the desired isometric projection. Obviously, with this method, any isometric angle from 0° to 90° may be used.

The device is also used to form ellipses and does not require a calculation of the maxima and minima axes. Indicia 79 on plate 58 gives the maxima-minima ratio for ellipses from a circle at 0° of inclination to a straight line obtained at an inclination of 90°. In practice, arm 72 is moved to describe a circle, such movement being carried out by travel of the assembly on rail 22. The correct vectors are obtained with the angle at which quadrant arm 70 is positioned, since doing so converts the circle described by stylus arm 72 into an ellipse. As is well known, a circle appears in an isometric projection as an ellipse. With this device the correct center of the ellipse can always be found. Geometrically, a circle is a closed plane curve such that all of its points are equidistant from a point within, called its center. To find this center, lines 90 degrees apart are drawn tangent to the circumference of the circle, to form a square enclosing the circle. Diagonals drawn to opposed corners will intersect at the center of the circle. An ellipse is merely a compressed circle, all of whose parallel half chords perpendicular to a diameter have been shortened in the same ratio. Thus, in drawing the same lines as is done for a circle, a parallelogram is formed. Diagonals drawn to opposed corners of the parallelogram will find the center of the ellipse at the point of intersection.

Stylus pin 171 could be used to follow a circle directly in order to obtain the ellipse formed by quadrant arm 70. However, it is generally difficult to follow a circular line accurately. To provide means to obtain a perfect circular movement for stylus arm 72, ellipse template 26 is used.

Template 26 is best depicted in Figures 9 and 10 and comprises a base 210, a block 212 and template arm 214. Block 212 is secured to base 210 in any preferred manner at 217 and contains an annular recess to seat rotatively therein a circular plate or disk 218. Axial apertures 220 extend through the base, block and plate to provide a bearing for pin 222 adapted to rotate when the template arm is rotated. Pin 222 is provided with flanges 224 to provide spacing means for free rotation of the template arm and plate. Lock nut 226 retains pin 222 on the ellipse template.

Arm 214 is apertured at 228 and receives the upper end of bearing pin 222 to align the template arm with the axis of rotatable plate 218. A scale 230, preferably in inches to indicate the radius of the ellipse to be projected, is inscribed on the template arm. Vernier scale 232 for fine adjustment is slidable on arm 214 and lies closely adjacent scale 230.

Vernier 232 is U-shaped and comprises arms 236 connected by cross piece 237, which is of considerable width. Vernier 232 slides on template arm 214 and is bored at one end to receive a threaded screw 238 extending therethrough and pressing C-bar 240 into frictional engagement with the side edge of template arm 214. Vernier slide 234 is open at 242 to make visible scale 230 and contains also a vertical boss 244, apertured at 246, to receive stylus pin 169 or 171 extending vertically through boss 170 on stylus arm 72. It is apparent that any means to rotate the arm may be employed.

Base 210 is threadedly apertured at 248 to receive fixing screws 250 containing pins 252. Template 26 is thus retained immovably in any position by means of pins 252 penetrating the surfaces of the support.

When the device is to be used to form ellipses, quadrant arm 70 is adjusted by movement in an arc until the required given angle or ratio is found on scale 77 or 78. Screw 108 is tightened to retain arm 70 in position. The diameter of the major axis of the ellipse is determined, and the radius thereof is measured off on template arm 214 by sliding vernier 234 along scale 230 until the radius is obtained. Set screw 238 maintains vernier 234 in position. Ellipse template 26 is then aligned with boss 170 on stylus arm 72 and stylus pin 169 is extended through the aligned apertures. Rotation of arm 214 in a circle about pivot 222 causes stylus arm 72 to reciprocate on rail 164, and by virtue of the direct linear displacement of endless band 190, quadrant assembly 20 moves horizontally on rail 22 whereby scribe 80 constructs the correct ellipse on the output side of the device.

The isometrograph of the invention is capable of forming any size and angle ellipse. It has many other uses. When combined with a cutting torch, it may be used directly for pipes that are to be fitted at an angle, as in the lofting of aircraft. Also, with a cutting tool, ellipse templates can be made directly in any size and degree. The mechanical operation completely obviates the old methods of hand operation.

Obviously many modifications and variations of the present invention are possible in the light of the above teachings. It is therefore to be understood that within the scope of the appended claims the invention may be practiced otherwise than as specifically described.

What is claimed is:

1. A drafting instrument providing X axis and Y axis motions comprising a frame movable along the X axis and including a substantially triangular cut-out section, one leg of said triangle being in the form of a quadrant arc, means on said frame reciprocable in a direction parallel to the Y axis, means pivotally secured at one end to said frame and adjustably attached on the other end to the quadrant arc to convert movement along said axes to movement on an isometric axis, a scribe holder slidable in said pivoted means, and means interconnecting said reciprocating means and scribe holder whereby movement of said reciprocating means parallel to the Y axis reciprocates the holder in said pivoted means and movement of said frame along the X axis moves the holder correspondingly in the X direction to produce an isometric projection.

2. The combination of claim 1 wherein said instrument includes a rail positioned parallel to said X axis, and roller wheels secured on said frame and riding on said rail.

3. A drafting instrument comprising a frame movable along a straight line and including a substantially triangular cut-out section, one leg of said triangle being in the form of a quadrant arc, indicia on said arc, a quadrant arm pivotally secured on said frame and engaging said quadrant arc and sweeping said cut-out section, an elongated channel in said arm, scribe means slidably retained in said channel, means engaging said scribe means to render said scribe means inoperative, reciprocating means on said frame and means linking said reciprocating means and said scribe means whereby movement of said reciprocating means causes the scribe means to move in order to inscribe an isometric projection.

4. The combination of claim 3 wherein said quadrant arm includes clamp means having a vernier scale, said clamp means slidably engaging said quadrant arc.

5. A drafting instrument comprising a frame movable normal to said straight line and including a substantially triangular cut-out section, one leg of said triangle being in the form of a quadrant arc, indicia on said arc, a quadrant arm pivotally secured on said frame and engaging said quadrant arc and sweeping said cut-out section, an elongated channel in said arm, a scribe holder slidably retained in said channel, means in said scribe holder to receive a scribe, means tension means attached to said holder urging said scribe holder into operative position, reciprocating means mounted slidably on said frame and means linking said reciprocating means and said scribe holder whereby movement of said reciprocating means causes the scribe to inscribe an isometric projection.

6. The combination of claim 5 wherein said scribe holder includes a plate member slidable in said channel, said linking means including an endless band extending along one edge of the frame and along the quadrant arm, said endless band being also secured to said reciprocating means, a finger vertically extended from said plate member and secured to said endless band, whereby movement of said reciprocating means causes the scribe holder to be linearly displaced in said channel.

7. A drafting instrument comprising a frame including a substantially triangular cut-out section, one leg of said triangle being in the form of a quadrant arc, indicia on said arc, a quadrant arm pivotally secured on said frame and engaging said quadrant arc and sweeping said cut-out section, an elongated channel in said arm, a scribe holder slidably retained in said channel, means in said scribe holder to receive a scribe, a cam lever pivotally mounted on said scribe receiving means, reciprocating means mounted slidably on said frame, an endless band mounted on said frame and secured to said scribe holder and reciprocating means to slide said scribe holder in the channel when the reciprocating means is operated.

8. The combination of claim 7 wherein said cam lever is L-shaped, the horizontal ear being seated on said holder whereby movement of said lever causes the camming action of the horizontal ear to raise or lower the scribe receiving means.

9. A drafting instrument comprising a frame movable along a straight line and having a substantially triangular cut-out section, one leg of the triangle being in the form of a quadrant arc, indicia on said arc, a quadrant arm pivotally secured on said frame, and engaging said quadrant arc and sweeping said cut-out section, scribe means mounted on said quadrant arm for sliding movement therealong, a stylus arm slidably mounted on said frame, a cable clamp assembly extending through said stylus arm and an endless cable mounted on said frame and on said quadrant arm and secured to said cable clamp assembly and to said scribe means whereby reciprocation of the stylus arm will actuate the scribe means for sliding movement along said quadrant arm.

10. The combination of claim 9 wherein said clamp assembly includes a passageway, a stem extending through said passageway and flanged at the free end and means to raise and lower said stem.

11. The combination of claim 10 wherein said frame includes a bore and a housing on said frame, pulley means in said housing, said housing including a rod extended into said bore, and tension means on said rod engaging said housing; said cable being retained on said pulley means in said housing whereby the tension means maintains the cable taut.

12. A drafting instrument comprising a frame slidable along a straight line and having a substantially triangular cut-out section, one leg of the triangle being in the form of a quadrant arc, indicia on said arc, a quadrant arm pivotally secured on said frame and engaging said quadrant arc and sweeping said cut-out section, scribe means mounted on said quadrant arm for sliding movement therealong, a stylus arm slidably mounted on said frame, a cable clamp assembly extending through said stylus arm, an endless cable mounted on said frame and on said quadrant arm and secured to said cable clamp assembly and to said scribe means whereby reciprocation of the stylus arm will actuate the scribe means for sliding movement along said quadrant arm, an ellipse template including rotatable means, and means connecting said rotatable template means to said stylus arm, whereby rotation of said template means reciprocates the stylus arm.

13. The combination of claim 12 wherein said ellipse template includes a base, a disk rotatable on said base, a template arm secured to said disk, an adjustable slide on said arm coacting with said arm connecting means and a scale on said arm cooperating with said slide.

14. The combination of claim 13 wherein said template arm includes a vernier member slidably mounted thereon, a boss on said vernier into which the arm and connecting means extends and means engaging said template arm and fixing in predetermined position the vernier member on said template arm.

15. The combination of claim 14 wherein said vernier member is U-shaped, a C-bar within said vernier member and a set screw extending through said vernier member and engaging said C-bar to cause the latter to seat against the template arm and restrict sliding movement of the vernier member on the template arm.

References Cited in the file of this patent
UNITED STATES PATENTS

| | | |
|---|---|---|
| 1,436,471 | Bell | Nov. 21, 1922 |
| 1,484,702 | Dowling | Feb. 26, 1924 |
| 2,070,675 | Niemeyer | Feb. 16, 1937 |
| 2,091,332 | Owen | Aug. 31, 1937 |
| 2,104,515 | Golden | Jan. 4, 1938 |
| 2,409,290 | Lipp | Oct. 15, 1946 |
| 2,553,026 | Williams | May 15, 1951 |
| 2,559,222 | Moore | July 3, 1951 |
| 2,557,447 | Masi | June 19, 1951 |
| 2,582,275 | Poetzsch | Jan. 15, 1952 |
| 2,615,251 | Edmunds | Oct. 28, 1952 |
| 2,636,271 | Valois | Apr. 28, 1953 |
| 2,671,965 | Pollitt | Mar. 16, 1954 |

FOREIGN PATENTS

| | | |
|---|---|---|
| 572,948 | Germany | Mar. 25, 1933 |